United States Patent [19]

Georgescu

[11] Patent Number: 5,048,219

[45] Date of Patent: Sep. 17, 1991

[54] FREE FLOATING FISH CATCHING DEVICE

[76] Inventor: George Georgescu, 1301 Ann St., Humble, Tex. 77338

[21] Appl. No.: 510,955

[22] Filed: Apr. 19, 1990

Related U.S. Application Data

[63] Continuation-in-part of Ser. No. 436,313, Nov. 13, 1989.

[51] Int. Cl.[5] ............................................. A01K 61/00
[52] U.S. Cl. .......................................... 43/4; 43/44.9; 43/44.88; 43/17
[58] Field of Search ......................... 43/4, 44.88, 44.92

[56] References Cited

U.S. PATENT DOCUMENTS

| | | | |
|---|---|---|---|
| 2,779,122 | 6/1957 | De Groff | 43/44.9 |
| 3,524,277 | 8/1970 | Neubert | 43/44.88 |
| 3,714,731 | 2/1973 | Benson | 43/44.88 |
| 4,486,969 | 12/1984 | Swenson | 43/17 |
| 4,934,090 | 6/1990 | Storey | 43/17 |

Primary Examiner—Richard K. Seidel
Assistant Examiner—Chuck Y. Mah
Attorney, Agent, or Firm—James L. Jackson

[57] ABSTRACT

A free floating fish catching device is provided having a large dimension, generally flat float structure having upper and lower surfaces. A connector projection extends upwardly from the central portion of the top surface and defines an aperture to receive one end of a swivel to which a fishing leader and hook are connected. The fish catching device is inverted by a biting fish to expose an attention attracting surface to provide an indication that a fish has been caught. A lifting loop is also provided to enable the device to be lifted from the water along with the fish. The inverted top surface of the device functions as a water brake to retard movement of the device by the fish and functions together with the leader connector element to cause a caught fish to swim in a circle rather than swimming away with the device.

8 Claims, 1 Drawing Sheet ive fish catching device having a large diameter and being of generally circular configuration and further having a fish restraining connector extending from the central portion thereof, thus enabling the device to function as a water brake to restrain fish movement.

FREE FLOATING FISH CATCHING DEVICE

This application is a Continuation-In-Part of U.S. Pat. application Ser. No. 07/436,313, filed on Nov. 13, 1989, now abandoned, on behalf of Francois Mouawad and George Georgescu, entitled EASY FISH CATCHER.

FIELD OF THE INVENTION

This invention relates to apparatus for catching fish and more particularly to a free floating fish catching device that floats freely on the surface of the water and which is inverted by the force of a biting fish to expose an attention attracting surface. Even more specifically, this invention concerns a free floating fish catching device of generally flat configuration and having a substantially large dimension causing the device to function as a water brake restraint for quickly tiring a caught fish and causing the fish to remain in the immediate area where caught until the fish and the device are retrieved.

BACKGROUND OF THE INVENTION

In most cases recreational fishing is accomplished by providing a fishing line which is attached to a fishing pole, rod and reel, etc. and which is used to locate a baited hook in a desired location for catching fish. When a fish is attracted to the bait and upon biting is caught by the hook, the fisherman, who must typically attend the fishing line becomes aware of the caught fish and retrieves the fish by means of the fishing line. In some cases for recreational fishing, trot lines and throw lines are employed for location of a plurality of fishing stagings and hooks along a main fishing line. The hooks of the trot line or throw line are baited and typically left for an extended period during which fish bite and are caught by the hooks and are restrained until later retrieved. In virtually all cases during recreational fishing activities, the caught fish are restrained by a trot line, throw line, and/or fishing line, etc. it is desirable, therefore, to provide a fish catching device that freely floats in a body of water and which is capable of attracting fish, catching the fish, and functioning as a water brake to minimize movement of the fish after the same is caught.

DESCRIPTION OF THE PRIOR ART

U.S. Pat. No. 2,799,122 of De Groff discloses a turnover float which is turned over by a biting fish to provide an indication that the fish has been caught and which is tethered by means of a fishing line 12 which is retrieved in customary fashion by means of a fishing pole, rod and reel, etc. to retrieve the float and the fish. The apparatus of De Groff is not intended as a free floating fish catching device. The Patents of Merriweather, Miners and Harris have similar features.

SUMMARY OF THE INVENTION

It is a principle object of this present invention to provide a novel free floating fish catching device which is adapted to float freely on the surface of a body of water during fishing activities without being tethered by any restraining line.

It is also a feature of this invention to provide a novel free floating fish catching device having the capability of becoming inverted due to the force of a biting fish and to expose an attention attracting surface and thus provide an indication that a fish has been caught.

It is an even further feature of this invention to provide a novel free floating fish catching device having a large diameter and being of generally circular configuration and further having a fish restraining connector extending from the central portion thereof, thus enabling the device to function as a water brake to restrain fish movement.

It is also a feature of this invention to provide a novel free floating fish catching device which is of generally flat configuration having a fish restraining connector extending from the center thereof and which functions by guiding its swimming movement to maintain a fish at the immediate vicinity of its location when caught until such time as the device and fish are retrieved.

Briefly, the free floating fish catching device is of generally flat, circular configuration and provides a fish catching connector that extends upwardly from its upper surface. A swivel device is secured to the fish restraining connector and provides for connection of a hook containing leader thereto. The swivel enables the fish to rotate the leader without inducing undesirable rotation to the fish catching device or fouling the leader.

The basic central structure of the fish catching device includes a generally circular core of buoyant material having substantially flat upper and lower surfaces. Substantially flat upper and lower plates formed of generally rigid material such as metal or any one of a number of suitable plastics materials are secured to the respective upper and lower surfaces of the buoyant core by means of nut and washer assemblies. One of the nuts is threadedly received by a centrally located bolt member which serves as the fish catching and restraining element.

At its underside, the fish catching device is provided with a retrieval ring or loop which is only exposed when the fish catching device is inverted as a result of the fish biting the hook. When so inverted by the force applied by a fish, the lower attention attracting surface of the device is exposed to provide visual indication that a fish has been caught. After the fish has been caught, the free floating fish catching float device may be retrieved by hand or by means of a retrieval pole with a hook or other device at its free extremity for engagement with the loop or ring at the upper portion of the fish catching device.

Since the fish catching device is of generally circular form and since the fish restraining bolt extends from the center of the device, the flat surface provided at the upper portion of the device presents significant surface area to the water thereby causing the device to function as a water brake. This prevents the fish from towing the device away after having been caught. Further, the centrally located fish restraining bolt connector and the generally circular flat configuration of the fish catching device function as a fish guiding or direction controlling apparatus to thus cause the fish to swim in circles after having been caught. This feature prevents the fish from towing the device a significant distance from where it was caught and thus assures that the device will remain at the catching location while the fish is tired to the extent that its movement becomes insignificant.

BRIEF DESCRIPTION OF THE DRAWINGS

So that the manner in which the above recited features, advantages and objects of the present invention are attained and can be understood in detail, a more particular description of the invention, briefly summa-

IN THE DRAWINGS

Figure 1:
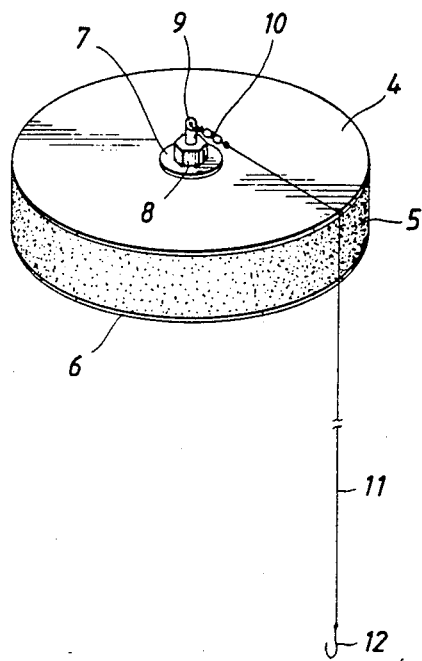

FIG. 1 is an isometric illustration of a free floating fish catching device which is constructed in accordance with the present invention and which is shown in its fishing position prior to catching a fish.

Figure 2:
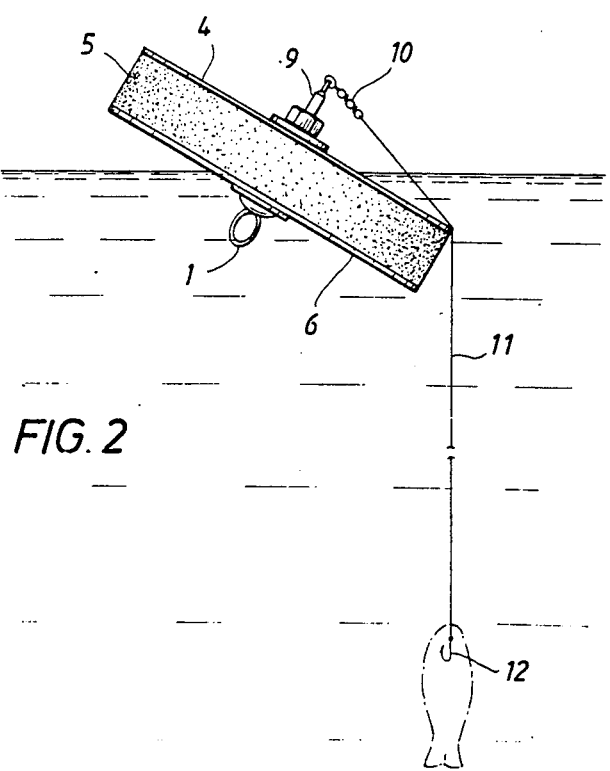

FIG. 2 is a side elevational view of the free floating fish catching device of FIG. 1 illustrating tipping of the device by the force applied by a fish to its swiveled leader and hook.

Figure 3:
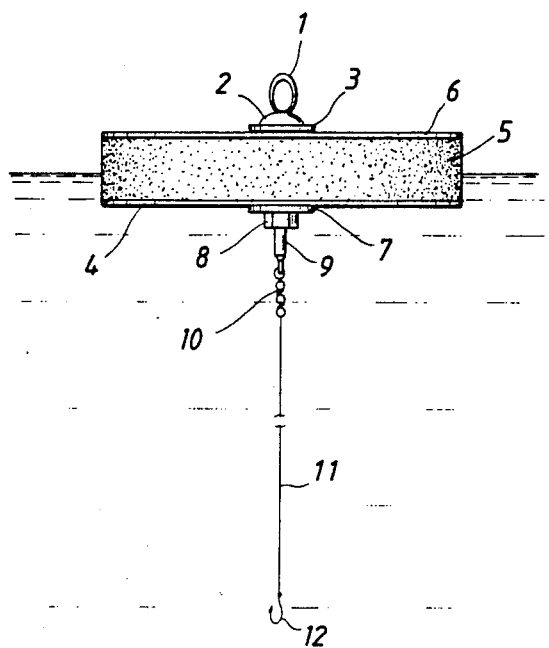

FIG. 3 is an elevational view of the free floating fish catching device of FIGS. 1 and 2 representing the inverted floating position of the device.

Figure 4:
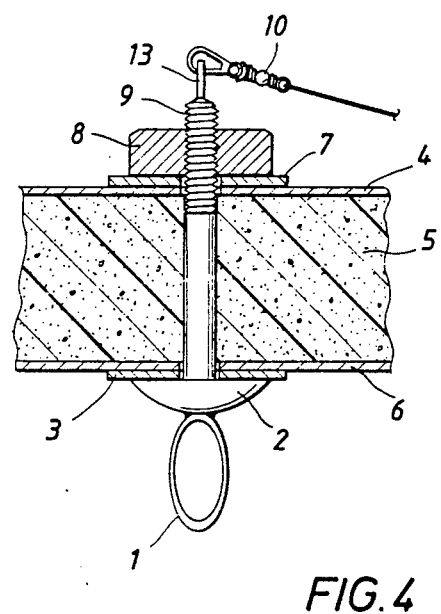

FIG. 4 is a fragmentary sectional view of the free floating fish catching device of FIGS. 1 and 2 illustrating the construction details of the central portion of the fish catching device.

DETAILED DESCRIPTION OF PREFERRED EMBODIMENT

Referring now to the drawings and first to FIG. 1 the free floating fish catching device of this invention is shown to include a generally circular, substantially flat buoyant central core 5 which is formed of any suitable buoyant material such as styrofoam for example. Upper and lower protective plates 4 and 6 respectively are secured in assembly to respective upper and lower generally flat surfaces of the central core 5. The protective plates 4 and 6 are composed of any suitable substantially rigid material such as a light weight metal in the nature of aluminum or an aluminum alloy or a suitable plastics material such as polystyrene. The outer edges of the plates 4 and 6 provide a protective function to insure against undesirable wear or erosion of the relatively soft buoyant core 5. The circular dimension of the device as defined by the plates 4 and 6 and the buoyant core 5 will be in the range of from about 4 inches to about 14 inches in diameter. Further, the configuration of the device may be other than circular if desired.

In order to restrain the plates 4 and 6 in assembly with the core, a bolt member 9 is provided which extends through respective apertures in the flat plates 4 and 6 and the buoyant core 5. The bolt includes a head 2 at one end which bears against a washer 3 or other suitable restraining device. The washer member 3 is provided between the plate 6 and bolt head 2 to further serve to restrain the bolt against movement relative to the lower protective plate member 6. At the upper side of the free floating fish catching device a washer member 7 is disposed in restraining contact with the plate member 4 and is provided to restrain a nut member 8 which is threadedly received by the bolt member 9. The nut member 8 is tightened on the bolt to insure retention of the upper and lower protective plate members 4 and 6, the washers 3 and 7 and the bolt member 9 in immovable relation with the central buoyant core 5.

From the head of the bolt 9 extends a retrieval ring or loop 1. During normal fishing activities the ring 1 is located under water because it projects downwardly from the bolt head 2 which is located at the bottom of the free floating fish catching device immediately beneath the lower plate 6 and the lower washer 3. When a fish inverts the free floating fish catching device to the position shown in FIG. 3 the retrieval ring 1 is exposed above the surface of the water. The free floating fish catching device can thus be retrieved without getting the hands wet by grasping the ring 1 or by inserting in the retrieval ring a hook or other retrieval device at the free end of a hand manipulated pole.

In FIG. 2 the fish catching device is shown to be tilted in the water by the force of a caught fish. As shown in FIG. 3 the fish catching device is shown in its inverted position after being inverted by the force of a biting fish. In FIG. 4 the fish catching device is shown in its normal fishing condition and is shown in enlarged partial section to illustrate the detailed construction of the preferred embodiment.

The bolt 9 is provided at its free extremity with a flattened blade-like projection having an aperture therein or other suitable connector to which a swivel member 10 is connected. To the swivel member 10 is connected a length of fishing leader 11 with a suitable fish hook 12 located at the free lower end of the leader or connected to or supported by the leader in any suitable fashion for the fishing activity to be conducted.

The free floating fish catching device of this invention will float on the surface of the water essentially in the condition shown in FIG. 1 with the hook 12 appropriately baited to attract fish. When a fish takes the bait on the hook and attempts to move away with the bait, the force applied to the leader 11 by the fish will pull downwardly on the upper outer peripheral edge of the device formed by the upper plate 4, causing it to pivot in the water in the manner shown in FIG. 2 as the device begins to flip over. The large surface area of the fish catching device and its significant mass function to restrain pivotal flipping movement of the device as shown in FIG. 2. In fact, the resistance of the device as it is pivoted and flipped over as shown in FIGS. 2 and 3 tends to force the barb of the hook through the mouth tissues of the fish, thereby securely retaining the fish. When the fish applies significant force to the leader 11, such as when the fish takes the bait and attempts to swim away with it, this force being applied to the outer edge of the float as shown in FIG. 2 will cause the float to be completely inverted to the position shown in FIG. 3. When inverted, the attention attracting surface formed by the lower circular protective plate 6 will be visually exposed. The surface of the plate 6 may be painted with an attention attracting color to provide an indication to the fisherman that either a fish has been caught or a fish has applied sufficient force to the device to invert it from its FIG. 1 position to the position shown in FIG. 3. The free floating fish catching device has sufficient buoyancy that any attempt of the fish to pull the device downwardly through the water will be restrained by its buoyancy. Additionally, the large surface area defined by the circular protective plate 6 will function as a water brake, resisting the capability of the device to be towed by a fish. The resistance to towing which is induced by the buoyancy of the device and by its function as a water brake significantly retard the capability of a fish to move the device such that it and the fish will remain essentially at the location where it was caught. In fact, the fish in attempting to get away will follow the direction of least resistance, which in this case, due to the central location of the fish restraining projection defined by the bolt 9, will cause the fish to swim essentially in a circle. It has been found that in most cases the fish and fish catching device will be located only a few feet from where the fish was caught even though it is free floating and movable. Obviously, this assumes that the device is being utilized in conditions such as in the lake where there is no water current that will transport the device away from the fish catching site.

When it is desired to retrieve the device and the fish caught thereby, the device will be essentially in the position shown in FIG. 3. When so inverted, the retrieval ring 1 is exposed. The ring 1 may be grasped to permit the fisherman to remove the fish catching device from the water along with the fish without necessitating getting the hands wet. Alternatively, a hand manipulated pole with a hook at its free end may be used by inserting the pole mounted hook through the opening of the lifting ring 1 to thus lift the device and fish from the water. A hook and lifting pole arrangement may also be utilized to place the fish catching device in a reasonably inaccessible fishing location, such as in an opening between floating logs or in openings defined by other structures. This feature permits effective fishing activities in relatively inaccessible but highly productive fishing spots.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A free floating fish catching device, comprising:
   (a) a large dimensional generally flat float structure forming substantially a flat top surface having an outer edge and forming a bottom surface;
   (b) top and bottom wear resistant plate members respectively engaging said top and bottom surfaces of said float structure and cooperating with said float structure to form said outer edge, said bottom plate member forming a surface having a desired attention attracting appearance;
   (c) washer members engaging said top and bottom plate members;
   (d) a connector bolt being fixed to said float and extending through the central portion of said top and bottom plate members and through said washer members and having a free end projecting upwardly from the central portion of said top surface;
   (e) a nut member being threadedly received by said connector bolt and securing said connector bolt, said top and bottom plate members and said washer members in movable relation with said float structure; and
   (f) swivel means being secured to said free end of said connector bolt and adapted to receive a hook supporting leader such that said leader extends along said top surface to said outer edge and extends downwardly from said outer edge into the water, whereby the force applied by a fish to said leader is induced downwardly on said outer edge thus causing said float structure to become inverted and expose said bottom surface as an indication that a fish has been caught, said substantially flat top surface forming a water brake to restrain fish movement of said free floating fish catching device and quickly tire the fish.

2. The free floating fish catching device of claim 1, wherein:
   said outer edge of said float is of generally circular configuration.

3. The free floating fish catching device of claim 1, wherein:
   said top surface of said float has a dimension in the range of from about four inches to about fourteen inches.

4. The free floating fish catching device of claim 1, wherein:
   (a) said outer edge of said float is of substantially circular configuration; and
   (b) said top surface has a diameter of from about four inches to about fourteen inches.

5. The free floating fish catching device of claim 1, wherein:
   said wear resistant plate members are formed of metal.

6. The free floating fish catching device of claim 1, wherein:
   (a) said connector bolt forms an eye at said free end thereof; and
   (b) said swivel means being received by said eye.

7. A free floating fish catching device comprising:
   (a) a generally flat buoyant central bore having a substantially flat top surface and having a bottom surface;
   (b) substantially flat generally rigid top and bottom wear resistant plates being assembled respectively to said top and bottom surfaces and forming upper and lower outer edges of said fish catching device, said bottom wear resistant plate having an attention attracting appearance;
   (c) an elongate connector bolt element extending through said generally flat buoyant central core and said top and bottom wear resistant plates and being disposed in fixed relation with the central portion of said central core and said wear resistant plates and forming a free extension projecting upwardly from the central portion of said wear resistant plates, said elongate connector bolt forming a connector eye at the end of said free extension;
   (d) nut and washer means being received by said elongate connector bolt element and securing said top and bottom wear resistant plates in intimate relation with said buoyant central core; and
   (e) swivel means being secured to said connector eye of said connector bolt element and adapted to receive a hook supporting leader such that said leader extends along said top surface to said outer edge and extends downwardly from said outer edge into the water, whereby the force applied by a fish to said leader is induced downwardly on said outer edge thus causing said float structure to become inverted and expose said bottom surface as an indication that a fish has been caught, said substantially flat top wear resistant plate forming a water brake to restrain fish movement of said free floating fish catching device and quickly tire the fish.

8. The free floating fish catching device of claim 7, wherein:

said substantially flat top and bottom wear resistant plates are each of circular configuration and having a diameter in the range of from about four inches to about fourteen inches.

* * * * *